(12) United States Patent
Kwan

(10) Patent No.: US 7,559,646 B2
(45) Date of Patent: Jul. 14, 2009

(54) SPECTACLE FRAME ASSEMBLY

(75) Inventor: Po Kwong Kwan, Hong Kong (CN)

(73) Assignee: Faith Idea Limited, Kowloon (HK)

( * ) Notice: Subject to any disclaimer, the term of this patent is extended or adjusted under 35 U.S.C. 154(b) by 0 days.

(21) Appl. No.: 11/860,260

(22) Filed: Sep. 24, 2007

(65) Prior Publication Data

US 2009/0079933 A1  Mar. 26, 2009

(51) Int. Cl.
  *G02C 5/12* (2006.01)
(52) U.S. Cl. ........................ 351/137; 351/140
(58) Field of Classification Search ............ 351/76–80, 351/136–140, 124–135
See application file for complete search history.

(56) References Cited

U.S. PATENT DOCUMENTS 1,784,013 A * 12/1930 Kern ............................ 351/90
4,029,403 A * 6/1977 Harris ......................... 351/121

* cited by examiner

*Primary Examiner*—Huy K Mai
(74) *Attorney, Agent, or Firm*—William J. Sapone; Coleman Sudol Sapone P.C.

(57) ABSTRACT

A spectacle frame assembly is disclosed as including a pair of arm members, a spectacle frame for holding two pieces of optical lenses, and two nose pads engaged with the spectacle frame each via a ball and socket joint.

7 Claims, 3 Drawing Sheets

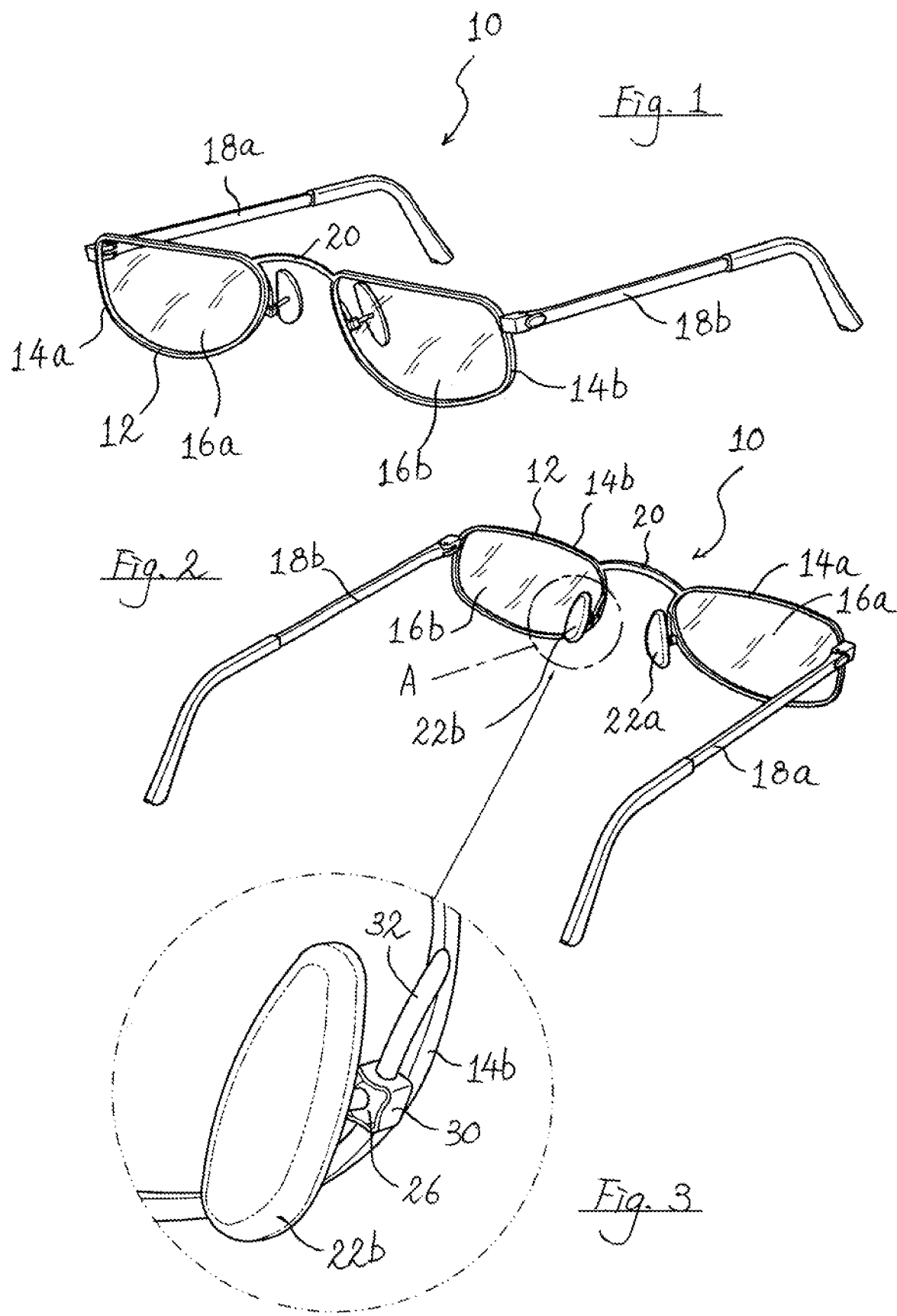

SPECTACLE FRAME ASSEMBLY

This invention relates to a spectacle frame assembly, and a pair of eyeglasses incorporating such a spectacle frame assembly.

BACKGROUND OF THE INVENTION

Spectacle frames of various construction have been available to which lenses may be mounted for forming pairs of eyeglasses for wearing. It is found that when a user wears a pair of eyeglasses by placing the eyeglasses onto his/her nose, it is usually necessary to adjust the position of the nose pads (and thus of the spectacles) to achieve comfort in wearing. In most cases only very minor adjustment to the position of the nose pads may be made. In some cases, it may even be necessary to forcibly bend the links joining the nose pads and the spectacle frame to suit individual needs. This may damage or even break the links and, thus, the spectacles.

It is thus an object of the present invention to provide a spectacle frame assembly and a pair of eyeglasses in which the aforesaid shortcomings are mitigated, or at least to provide a useful alternative to the trade and public.

SUMMARY OF THE INVENTION

According to a first aspect of the present invention, there is provided a spectacle frame assembly including a pair of arm members, a link member adapted to hold two pieces of optical lenses, and two nose pads engaged with said link member each via a ball and socket joint.

According to a second aspect of the present invention, there is provided a pair of eyeglasses including a spectacle frame assembly with a pair of arm members, a link member holding two pieces of optical lenses, and two nose pads engaged with said link member each via a ball and socket joint.

BRIEF DESCRIPTION OF THE DRAWINGS

A preferred embodiment of the present invention will now be described, by way of example only, with reference to the accompanying drawings, in which:

FIG. 1 is a front perspective view of a pair of eyeglasses incorporating a spectacle frame assembly according to a preferred embodiment of the present invention;

FIG. 2 is a rear perspective view of the pair of eyeglasses shown in FIG. 1;

FIG. 3 is an enlarged view of the part marked "A" in FIG. 2;

DETAILED DESCRIPTION OF THE PREFERRED EMBODIMENT

Figure 4:
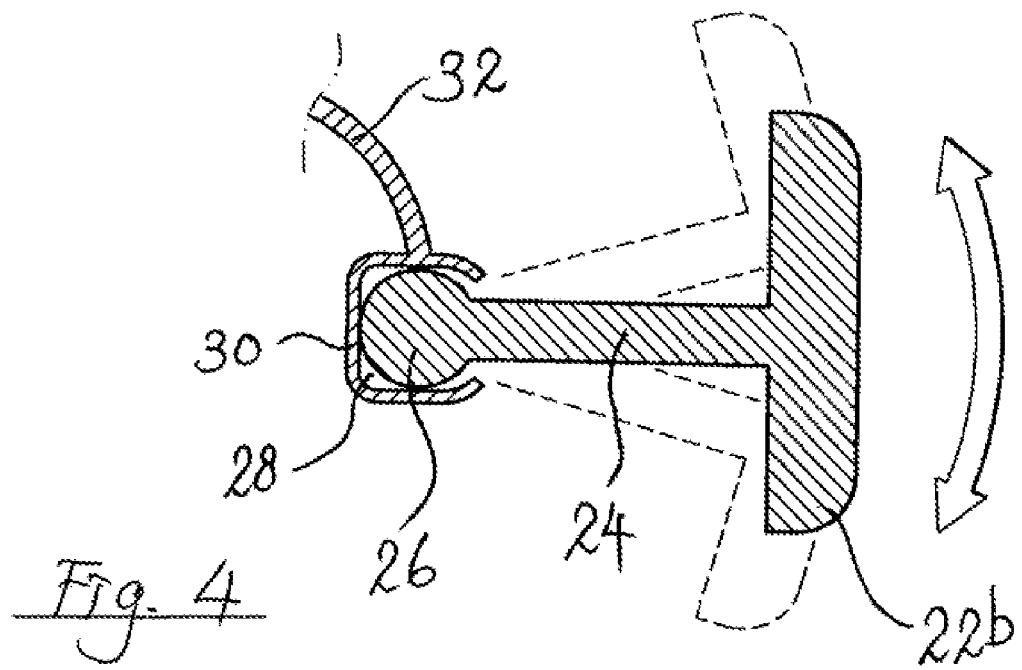
FIG. 4 is an enlarged sectional view through the ball and socket joint between the nose pad and the spectacle frame of the pair of eyeglasses shown in FIG. 1.

A pair of eyeglasses incorporating a spectacle frame assembly according to a preferred embodiment of the present invention is shown in FIGS. 1 and 2, and generally designated as 10. The pair of eyeglasses 10 includes a spectacle frame 12 with two mounting frames 14a, 14b to each of which a respective piece of optical lens 16a, 16b is releasably mounted. To the outer side of each mounting frame 14a, 14b is an arm 18a, 18b which is pivotable relative to the spectacle frame 12. The two mounting frames 14a, 14b are connected with each other via a bridge 20. To the inner side of each mounting frame 14a, 14b is engaged a nose pad 22a, 22b, in a manner to be further discussed below.

Figure 5:
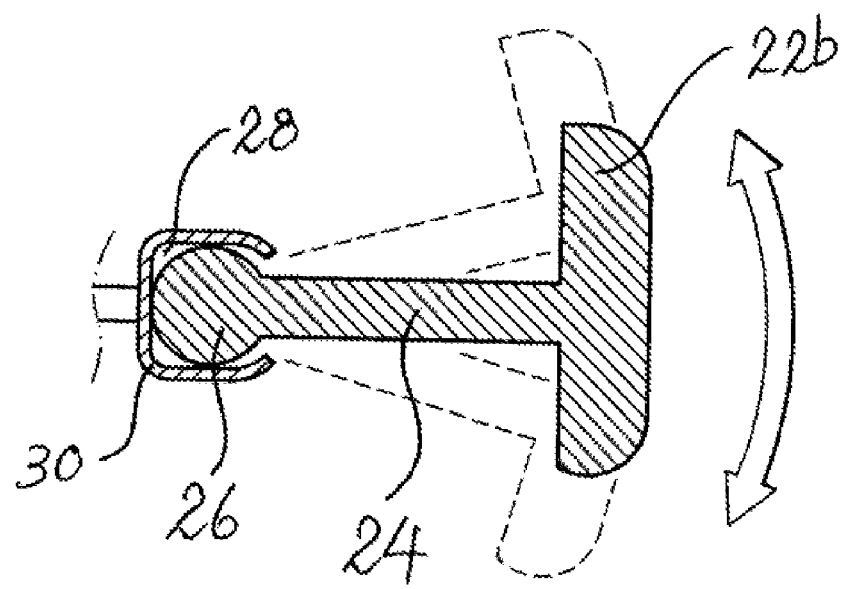
FIG. 5 is another enlarged sectional view of the ball and socket joint shown in FIG. 4, taken through a plane perpendicular to that through which the view in FIG. 4 is taken.
Figure 6:
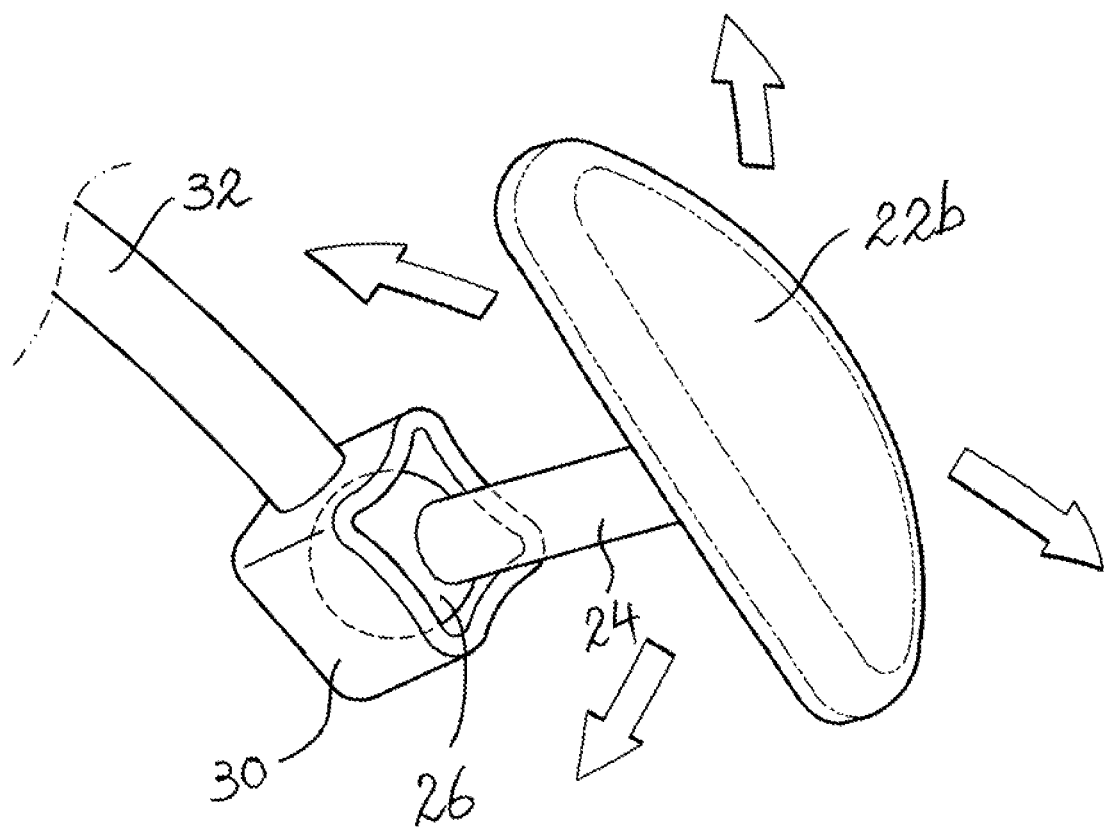
FIG. 6 is an enlarged view showing the possible relative movement between the nose pad and the spectacle frame.

FIG. 3 shows that the nose pad 22b is engaged with the mounting frame 14b via a ball and socket joint. As can be seen more clearly in FIGS. 4 to 6, and taking the nose pad 22b as an example, the nose pad 22b is fixedly engaged with a rod 24 with a rounded ball-like end 26 received within a cavity 28 of a generally cubic bracket 30, which is fixedly engaged with the mounting frame 14b via a rod 32. The walls of the bracket 30 are slightly deformed inwardly to bear on the outer surface of the ball-like end 26, so that the end 26 of the rod 24 cannot be retrieved from, but is rotatable relative to and within, the bracket 30, about the centre of the end 26. FIGS. 4 to 6 clearly show that, because of the ball and socket joint between the nose pad 22b and the mounting frame 14b, the nose pad 22b is rotatably movable relative to the bracket 30 (and thus the mounting frame 14b and the spectacle frame 12) about a large number of axes with a common centre. Some of these axes are perpendicular to each other. Such an arrangement allows easy adjustment of the positions of the nose pads 22a, 22b on and relative to the nose of a user when in use.

It should be understood that the above only illustrates an example whereby the present invention may be carried out, and that various modifications and/or alterations may be made thereto without departing from the spirit of the invention. In particular, it should be noted that although the present invention has thus far been described in the context of a spectacle frame in which the nose pad 22b is fixedly engaged with the rod 24 with the rounded end 26 received within the cavity 28 of the bracket 30 fixed to the mounting frame 14b via the rod 32, it is envisaged that the invention also encompasses the arrangement in which the mounting frame is fixedly engaged with a rod with a rounded ball-like end received within a cavity of a bracket fixedly engaged with the nose pad. Similarly, it is also envisaged that the nose pads 22a, 22b may be engaged with the spectacle frame 12, not via the mounting frames 14a, 14b, but via the bridge 20.

It should also be understood that various features of the invention which are, for brevity, here described in the context of a single embodiment, may also be provided separately or in any appropriate sub-combinations.

The invention claimed is:

1. A spectacle frame assembly including:
   a pair of arm members,
   a link member adapted to hold two pieces of optical lenses, and
   two nose pads engaged with said link member each via a ball and socket joint, each said ball and socket joint comprising a rod with a rounded head having an outer surface forming the ball, the rounded head being received within a generally cubic bracket having a plurality of walls, the bracket forming the socket of the ball and socket joint, said walls of said bracket bearing on said outer surface of said rounded head to prevent retrieval of said rounded head from said bracket.

2. A spectacle frame assembly according to claim 1 wherein each said nose pad is fixedly engaged with a respective rod with a rounded head having an outer surface.

3. A spectacle frame assembly according to claim 2 wherein said link member is fixedly engaged with a generally cubic bracket.

4. A spectacle frame assembly according to claim 1 wherein each said nose pad is fixedly engaged with a respective bracket.

5. A spectacle frame assembly according to claim 4 wherein each said link member is fixedly engaged with said rods each with a rounded head having an outer surface.

6. A spectacle frame assembly according to claim 1 wherein each said nose pad is movable relative to said link member about a plurality of axes with one common centre.

7. A pair of eyeglasses including a spectacle frame assembly according to claim 1 holding two pieces of optical lenses.

\* \* \* \* \*